US011400967B2

(12) United States Patent
Simons

(10) Patent No.: US 11,400,967 B2
(45) Date of Patent: Aug. 2, 2022

(54) WHEELBARROW WITH MULTIPLE WHEELS ON A FRONT AXLE

(71) Applicant: Roger Larry Simons, Davidson, NC (US)

(72) Inventor: Roger Larry Simons, Davidson, NC (US)

(73) Assignee: Roger Larry Simons, Davidson, NC (US)

(*) Notice: Subject to any disclaimer, the term of this patent is extended or adjusted under 35 U.S.C. 154(b) by 27 days.

(21) Appl. No.: 17/011,386

(22) Filed: Sep. 3, 2020

(65) Prior Publication Data

US 2021/0061333 A1 Mar. 4, 2021

Related U.S. Application Data

(60) Provisional application No. 62/895,401, filed on Sep. 3, 2019.

(51) Int. Cl.
*B62B 3/12* (2006.01)
*B62B 5/00* (2006.01)
*B62B 1/18* (2006.01)

(52) U.S. Cl.
CPC ............... *B62B 3/12* (2013.01); *B62B 1/186* (2013.01); *B62B 5/0036* (2013.01)

(58) Field of Classification Search
CPC .. B62B 1/186; B62B 3/00; B62B 3/12; B62B 5/0026; B62B 5/003; B62B 5/0033; B62B 5/0036; B62B 5/0046; B62B 5/005; B62B 5/0066; B62B 2202/031; B62B 2301/08; B62B 2301/14
See application file for complete search history.

(56) References Cited

U.S. PATENT DOCUMENTS

| | | | | |
|---|---|---|---|---|
| 858,496 | A * | 7/1907 | Baines | B62D 51/04 180/11 |
| 1,572,531 | A * | 2/1926 | Henkel | B62B 1/18 280/47.26 |
| 1,804,403 | A * | 5/1931 | Dowling | B62B 1/24 37/434 |
| 2,937,706 | A * | 5/1960 | Chandler | B60K 1/00 180/19.3 |
| 3,199,621 | A * | 8/1965 | Seaman | B60K 1/00 180/11 |
| 3,891,043 | A * | 6/1975 | Valdex | B62D 51/008 180/13 |
| 4,327,462 | A * | 5/1982 | Eggleston | B60B 33/00 16/47 |
| 4,589,508 | A * | 5/1986 | Hoover | B62B 1/24 180/13 |

(Continued)

*Primary Examiner* — Minnah L Seoh
*Assistant Examiner* — Maurice L Williams
(74) *Attorney, Agent, or Firm* — Quinn IP Law

(57) ABSTRACT

A wheelbarrow with multiple wheels on a front axle is provided. The wheelbarrow includes a cargo carrying portion, two load carrying members supporting the cargo carrying portion, and a motor providing an output torque. The wheelbarrow further includes the front axle attached to the two load carrying members, a middle wheel attached to the axle and receiving the output torque from the motor, and two side wheels attached to the axle, one on either side of the middle wheel wherein the two side wheels each have a smaller diameter than the middle wheel.

13 Claims, 8 Drawing Sheets

(56) References Cited

U.S. PATENT DOCUMENTS

| | | | | |
|---|---|---|---|---|
| 5,149,116 A * | 9/1992 | Donze | ................. | B62B 1/20 |
| | | | | 280/47.26 |
| 5,305,843 A * | 4/1994 | Armstrong | ............. | B62B 1/18 |
| | | | | 180/19.1 |
| 5,520,253 A * | 5/1996 | Kesting | ............. | A01B 33/027 |
| | | | | 172/125 |
| 5,531,463 A * | 7/1996 | Givens | ................. | B62B 1/22 |
| | | | | 280/47.2 |
| 5,601,299 A * | 2/1997 | Yun | ................. | A63C 17/004 |
| | | | | 280/11.223 |
| 5,878,827 A * | 3/1999 | Fox | ................. | B62D 51/04 |
| | | | | 180/19.1 |
| 6,241,276 B1 * | 6/2001 | Wilburn | .............. | B62B 1/20 |
| | | | | 280/47.18 |
| 6,745,859 B2 * | 6/2004 | Simons | ............... | B62B 1/206 |
| | | | | 180/19.1 |
| 7,775,306 B1 * | 8/2010 | Adkins | ............... | B62B 1/18 |
| | | | | 180/19.3 |
| 8,613,455 B2 * | 12/2013 | Berrett | ............... | F16C 17/04 |
| | | | | 280/78 |
| 10,053,126 B2 * | 8/2018 | Buttimer | ............. | B62B 3/08 |
| 10,124,820 B2 * | 11/2018 | Meyer | ................ | B62B 5/0006 |
| 10,137,920 B1 * | 11/2018 | Bolden | ................ | B62B 1/12 |
| 10,683,023 B1 * | 6/2020 | Cook | ................ | B62B 5/0026 |
| 2007/0089917 A1 * | 4/2007 | Hartley | ............... | B60L 50/66 |
| | | | | 180/65.1 |
| 2017/0334494 A1 * | 11/2017 | Ho | ................. | B62B 5/0043 |

* cited by examiner

WHEELBARROW WITH MULTIPLE WHEELS ON A FRONT AXLE

CROSS REFERENCE TO RELATED APPLICATIONS

This disclosure claims the benefit of U.S. Provisional Patent Application 62/895,401 filed on Sep. 3, 2019, the entirety of which is hereby incorporated by reference.

INTRODUCTION

This disclosure is related to a wheelbarrow including multiple wheels on a front axle, in particular, to a wheelbarrow including a relatively larger diameter middle wheel and two side wheels, one on either side of the larger diameter middle wheel.

BACKGROUND

Wheelbarrows may include a cargo containing portion and one or more wheels enabling a person to transport cargo within the cargo containing portion. Unpowered wheelbarrows may include one wheel located upon an axle near a front of the wheelbarrow, with two load carrying members being connected at one end to the one wheel and extending backwards and including handles upon terminal rearward ends of the load carrying members. The cargo carrying portion may be affixed atop the load carrying members. Two or more stand leg portions may extend downward from middle portions of the load carrying members to enable the wheelbarrow to rest upon the stand leg portions when a person is not holding the handles. In one embodiment, wheels may be attached to the stand leg portions to enable rolling movement of the wheelbarrow.

SUMMARY

Powered wheelbarrows may include a combustion engine or an electric motor providing motive force to one or more wheels of the wheelbarrow. Power may be delivered to a single wheel, however, such a single powered wheel may be susceptible to the wheelbarrow becoming stuck when traction is lost. Power may be delivered to multiple wheels at one time. When a single axle includes multiple spaced wheels and those wheels are affixed to the single axle, delivering power to the axle may be problematic when one is trying to turn the wheelbarrow. Both wheels affixed to the single axle need to turn at the same rate, while the wheels need to turn at different rates to permit rolling contact of the wheels with the ground through the turn. A differential device may permit both wheels to provide traction when the wheelbarrow is traveling in a straight line and may permit only one wheel to receive power through a turn. However, a differential device may cause problems, for example, in mud or icy conditions. When one wheel slips, the other wheel attached to the differential loses power. Such a condition with one wheel spinning and the other wheel losing power may cause such a wheelbarrow to lose usefulness in slippery conditions.

A wheelbarrow with multiple wheels on a front axle is provided. The wheelbarrow includes a cargo carrying portion, two load carrying members supporting the cargo carrying portion, and a motor providing an output torque. The wheelbarrow further includes the front axle attached to the two load carrying members, a middle wheel attached to the axle and receiving the output torque from the motor, and two side wheels attached to the axle, one on either side of the larger diameter middle wheel, wherein the two side wheels each have a smaller diameter than the middle wheel.

In some embodiments, the front axle is operable to rotate about a longitudinal axis of the front axle. In some embodiments, the front axle receives the output torque and spins with the middle wheel.

In some embodiments, the side wheels receive the output torque and spin with the front axle.

In some embodiments, the wheelbarrow further includes a drive sprocket attached to the front axle.

In some embodiments, the wheelbarrow further includes a gearbox attached to the motor and a drive chain connected to the gearbox and connected to the drive sprocket.

In some embodiments, the wheelbarrow further includes a motor mount plate connecting the motor to the load carrying members. In some embodiments, the motor mount plate enables mounting features of the motor to slide forward and backward to adjust a position of the motor relative to the front axle.

In some embodiments, the wheelbarrow further includes a gearbox attached to the motor and a drive belt connected to the gearbox and connected to the drive sprocket.

In some embodiments, the wheelbarrow further includes an idler sprocket adjusting tension in the drive belt.

In some embodiments, the wheelbarrow further includes two rear wheels.

In some embodiments, the wheelbarrow further includes a drive sprocket attached to the front axle and receiving the output torque and a removable pin attaching the drive sprocket to the middle wheel and causing the relatively larger wheel to spin with the drive sprocket. In some embodiments, when the removable pin is removed, the middle wheel is free to spin relative to the drive sprocket.

In some embodiments, the wheelbarrow further includes a worm-drive gearbox attached to the motor.

In some embodiments, the middle wheel includes a ball bearing enabling the middle wheel to spin freely relative to the front axle.

In some embodiments, the side wheels each include a ball bearing enabling the side wheels to spin freely relative to the front axle.

According to one alternative embodiment, a wheelbarrow with multiple wheels on a front axle is provided. The wheelbarrow includes a cargo carrying portion, two load carrying members supporting the cargo carrying portion, and a motor providing an output torque. The motor includes a gearbox attached to the motor. The wheelbarrow further includes the front axle attached to the two load carrying members, a drive sprocket attached to and operable to spin with the front axle, and a drive chain attached to the gearbox and operable to transmit the output torque from the motor to the drive sprocket. The wheelbarrow further includes a middle wheel attached to the axle and receiving the output torque from the drive sprocket and two side wheels attached to the axle, one on either side of the larger diameter middle wheel, wherein the two side wheels each have a smaller diameter than the middle wheel.

In some embodiments, the two side wheels receive the output torque from the drive sprocket.

According to one alternative embodiment, a wheelbarrow with multiple wheels on a front axle is provided. The wheelbarrow includes a cargo carrying portion, two load carrying members supporting the cargo carrying portion, and a motor providing an output torque. The motor includes a gearbox attached to the motor. The wheelbarrow further includes the front axle attached to the two load carrying members, a drive sprocket attached to and operable to spin with the front axle, and a drive belt attached to the gearbox and operable to transmit the output torque from the motor to the drive sprocket. The wheelbarrow further includes a middle wheel attached to the axle and receiving the output torque from the drive sprocket and two side wheels attached to the axle, one on either side of the larger diameter middle wheel, wherein the two side wheels each have a smaller diameter than the middle wheel.

In some embodiments, the two side wheels receive the output torque from the drive sprocket.

The above features and advantages and other features and advantages of the present disclosure overcoming challenges posed by other wheelbarrows are readily apparent from the following detailed description of the best modes for carrying out the disclosure when taken in connection with the accompanying drawings.

DETAILED DESCRIPTION

A wheelbarrow including a multi-wheeled powered axle is provided, including a relatively larger diameter middle wheel and two relatively smaller diameter side wheels, one on either side of the larger diameter middle wheel. Power supplied to the powered axle turns all three wheels. Under normal operation, the center, relatively larger diameter wheel is in contact with the ground and provides motive force to the wheelbarrow by transmitting torque from the powered axle to the center, relatively larger diameter wheel. When the wheelbarrow turns or when the center wheel slips, the user may tilt the wheelbarrow slightly to either side, providing additional traction as a respective one of the relatively smaller diameter side wheels comes into contact with the ground.

Throughout the disclosure, the wheelbarrow may be described as including a relatively larger diameter middle wheel attached to a front axle. This may in some embodiments be described as the wheelbarrow including a middle wheel attached to the front axle. The wheelbarrow may also be described throughout the disclosure as including two relatively smaller side wheels attached to the same from axle. This may in some embodiments be described as the wheelbarrow including two side wheels attached to the front axle, one on either side of the middle wheel, wherein the two side wheels each have a smaller diameter than the middle wheel. This configuration, a middle wheel and two smaller side wheels attached to the same front axle of the wheelbarrow enables the user to tilt the wheelbarrow to either side, engage a second wheel on the front axle to the ground surface, and increase an ability to move the wheelbarrow in a forward direction.

Figure 1:
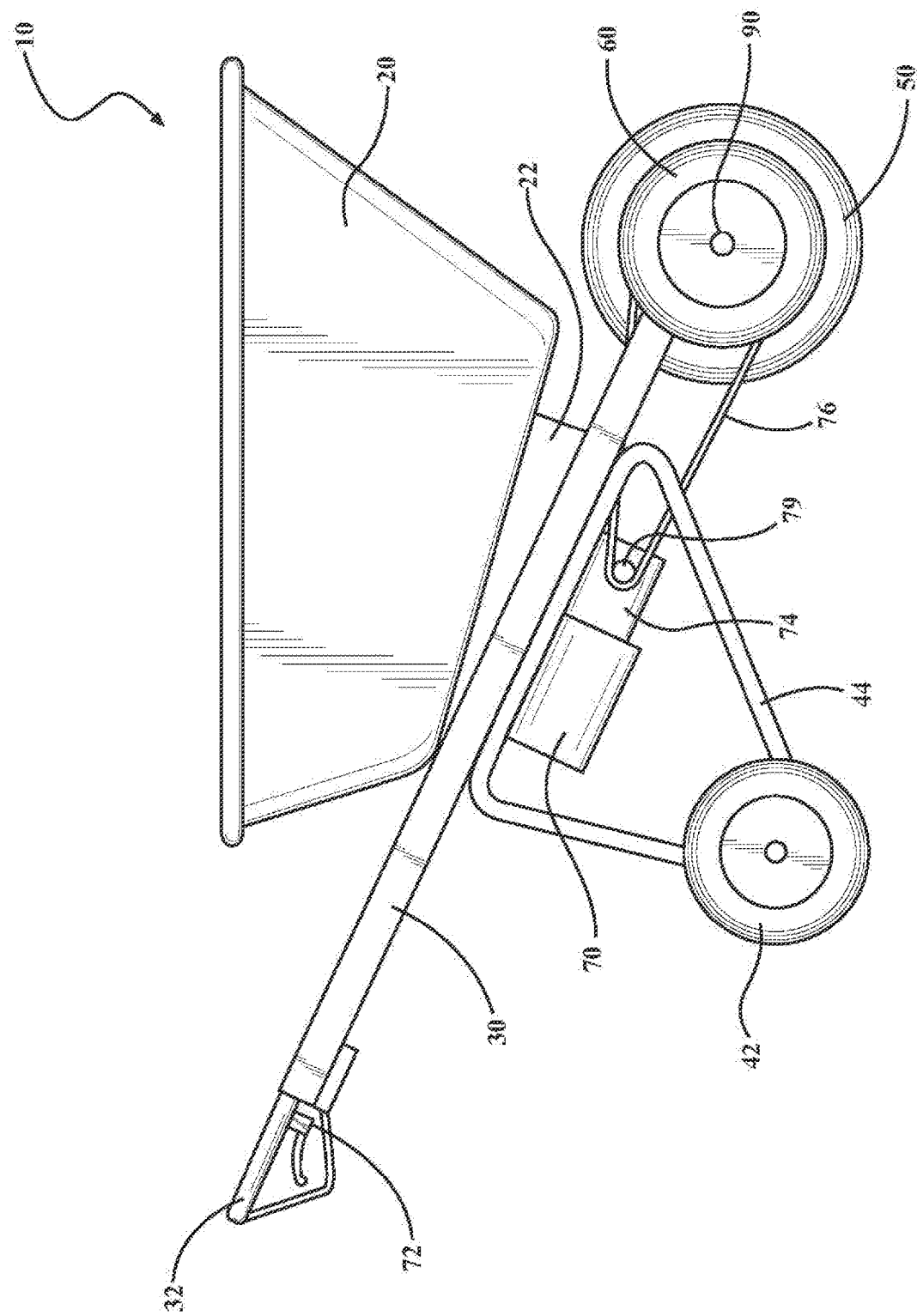
FIG. 1 schematically illustrates in a first side view an exemplary wheelbarrow including a multi-wheeled powered axle, in accordance with the present disclosure.

FIG. 1 schematically illustrates in a first side view an exemplary wheelbarrow 10 including a multi-wheeled powered axle. The wheelbarrow 10 is illustrated including a cargo carrying portion 20, two load carrying members 30, two stand leg portions 44, and a motor 70. The wheelbarrow 10 further includes a relatively larger diameter middle wheel 50 and two relatively smaller diameter side wheels 60 located on either side of relatively larger diameter middle wheel 50. Smaller diameter side wheels 60 located on either side of the larger diameter middle wheel 50 are coaxial and are all attached to axle 90, such that torque applied to any of the larger diameter middle 50, the smaller diameter side wheels 60, and the axle 90 is transmitted to everything attached to the axle 90. A throttle control 72 is illustrated configured to control activation and/or torque output of motor 70. Motor 70 may be an electric motor, an internal combustion engine, or any device operable to generate a torque to an output shaft.

The wheelbarrow 10 is further illustrated with a wedge shaped portion 22 acting as an interface between the cargo carrying portion 20 and the load carrying members 30. In one embodiment, there may be one wedge shaped portion 22 for each of the load carrying members 30. The load carrying members are illustrated with exemplary handle portions 32.

The wheelbarrow 10 is illustrated including two rear wheels 42. The two rear wheels 42 are optional. The wheelbarrow 10 may alternatively rest upon a lower portion of the two stand leg portions 44 or upon stand feet attached to the two stand leg portions 44.

If the motor 70 includes an electric motor, such a device may include an output shaft and internal structures useful to transform electrical energy into torque transmitted through the output shaft. Electrical energy may be stored in an energy storage device such as a battery device connected to the motor 70.

If the motor 70 includes an internal combustion engine, such a device may include an output shaft and internal structures useful to transform chemical energy into torque transmitted through the output shaft. Chemical energy may be stored in a fuel tank device connected to the motor 70.

A gearbox 74 is illustrated connected to the motor 70. The gearbox 74 includes internal structure to provide a gear ratio between the output shaft of the motor 70 and a drive sprocket 79 upon the gearbox 74. The drive sprocket 79 is connected to a drive chain 76. The drive chain 76 may include a series of chain links connected together and operable to transmit force from one sprocket to another sprocket. The drive chain 76 may be similar to a bicycle chain used in the art to transmit force between a bicycle pedal and a bicycle rear wheel sprocket. A sprocket may be mechanically connected to the larger diameter middle wheel 50, to one of the smaller diameter side wheels 60, and/or to axle 90, such that force applied to the sprocket may be transmitted to the larger diameter middle wheel 50, to one of the smaller diameter side wheels 60, and to axle 90.

Because the larger diameter middle wheel 50 is coaxial with the smaller diameter side wheels 60, under normal non-tilted operation of the wheelbarrow 10, the larger diameter middle wheel 50 is in contact with a ground surface under the wheelbarrow 10, while the smaller diameter side wheels 60 are not in contact with the ground surface. However, if the larger diameter middle wheel 50 loses traction, the user may tilt the wheelbarrow 10 to one side or the other, thereby causing one of the smaller diameter side wheels 60 to come into contact with the ground surface and providing increased traction for the wheelbarrow 10.

Diameters of the larger diameter middle wheel 50 and the smaller diameter side wheels 60 may be close to each other, for example, differing by one or two inches. If the difference in diameters is too great, in order to engage one of the smaller diameter side wheels to the ground surface, the wheelbarrow 10 would need to tip to one side to such a degree that cargo within the cargo carrying portion 20 could fall out.

Figure 2:
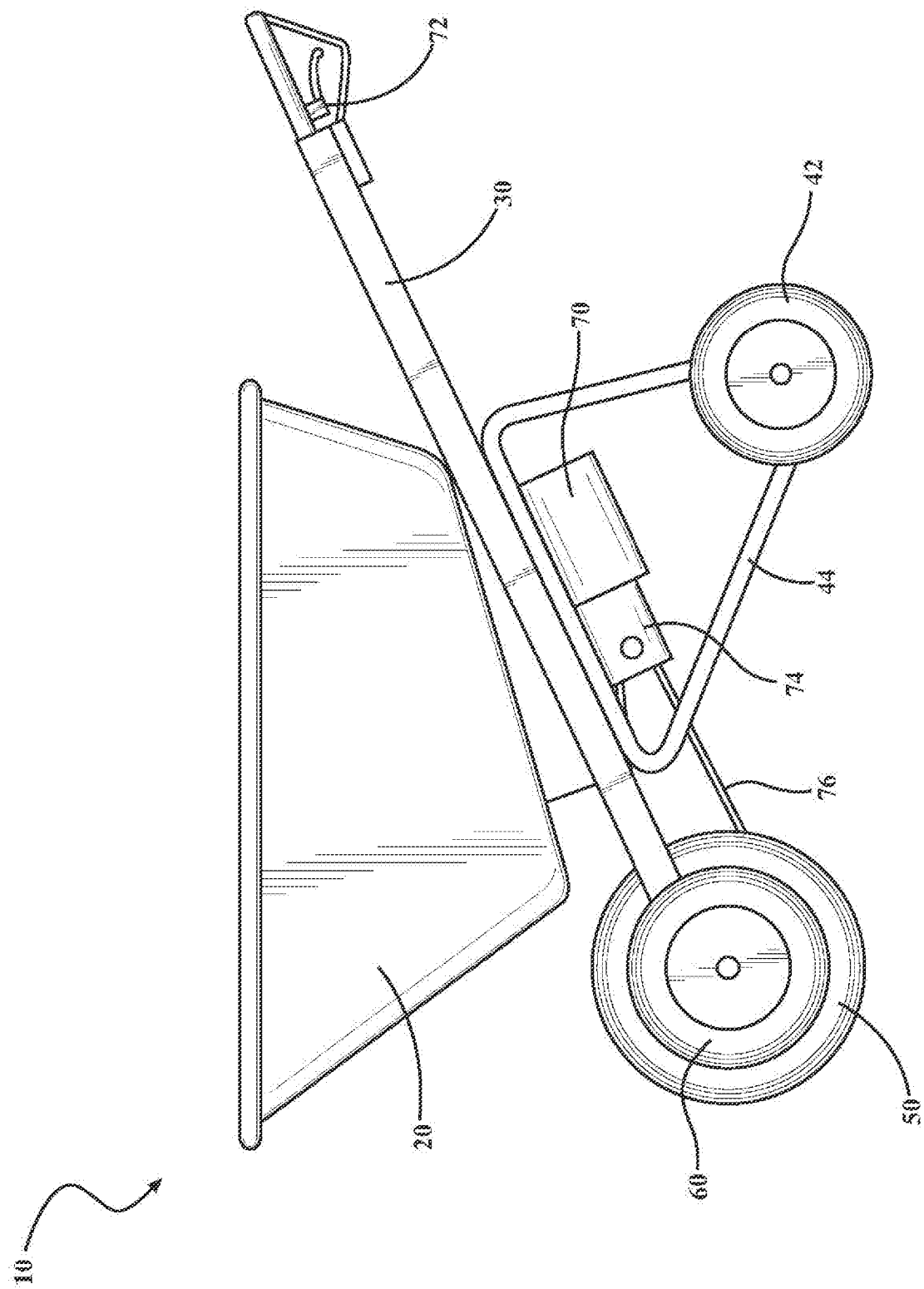
FIG. 2 schematically illustrates in a second side view the wheelbarrow of FIG. 1, in accordance with the present disclosure.

FIG. 2 schematically illustrates in a second side view the wheelbarrow 10 of FIG. 1. The wheelbarrow 10 is illustrated including the cargo carrying portion 20, the two load carrying members 30, the two stand leg portions 44, the rear wheels 42, the motor 70, the gearbox 74, the drive chain 76, the larger diameter middle wheel 50, and the smaller diameter side wheels 60. Throttle control 72 is illustrated configured to control activation and/or torque output of motor 70.

Figure 3:
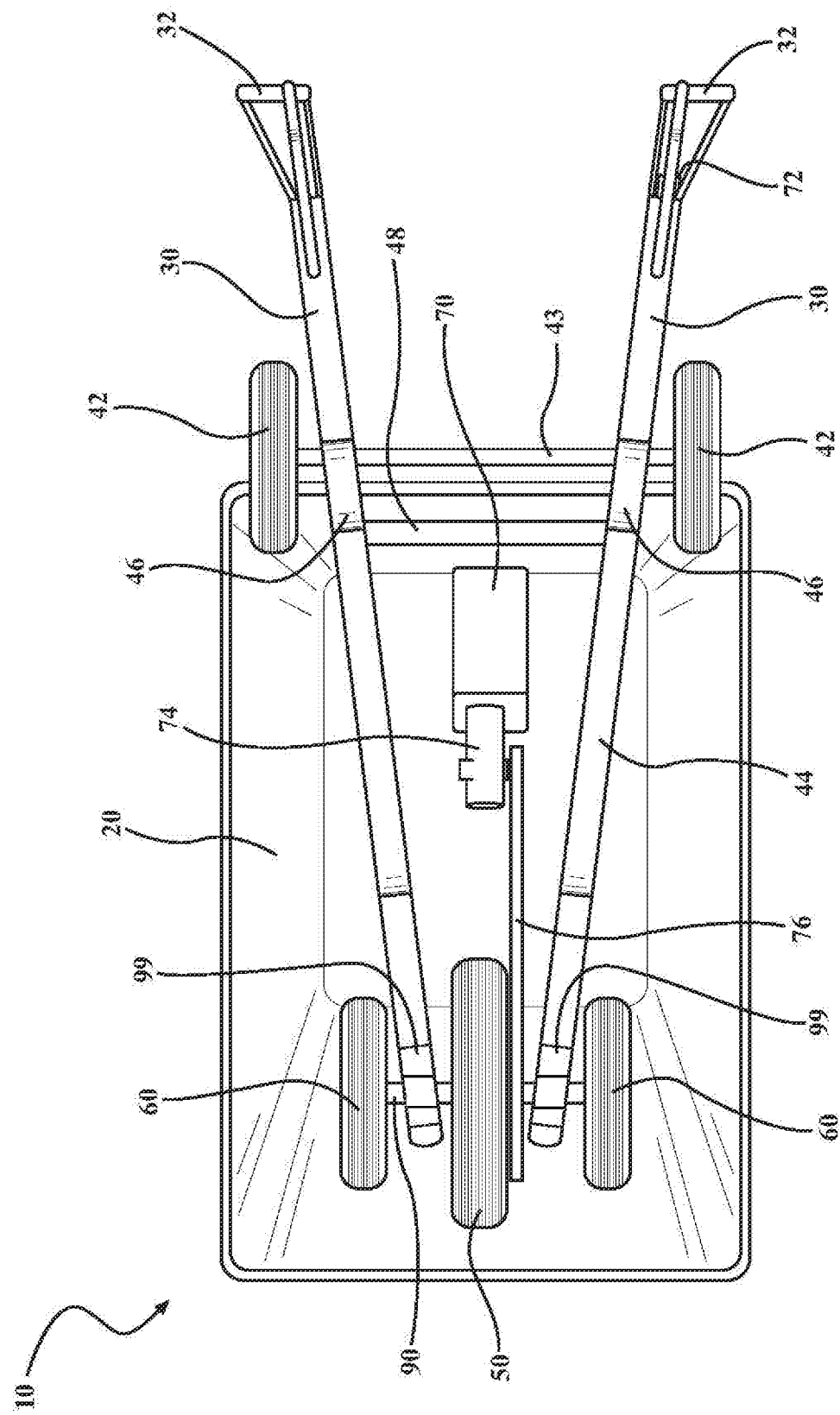
FIG. 3 schematically illustrates in a bottom view the wheelbarrow of FIG. 1, in accordance with the present disclosure.

FIG. 3 schematically illustrates in a bottom view the wheelbarrow of FIG. 1. The wheelbarrow 10 is illustrated including the cargo carrying portion 20, the two load carrying members 30, the two stand leg portions 44, the rear wheels 42, a rear wheel axle 43, the motor 70, the gearbox 74, the drive chain 76, the larger diameter middle wheel 50, and the smaller diameter side wheels 60. Throttle control 72 is illustrated configured to control activation and/or torque output of motor 70. The two handle portions 32 are illustrated attached to the two load carrying members 30.

Brackets 99 are illustrated connecting the axle 90 to each of the load carrying members 30. The rear wheel axle 43 is similarly bracketed or connected to the two stand leg portions 44. A leg stabilizing bracket 48 is illustrated horizontally spanning the two stand leg portions 44. Two stand leg feet 46 are illustrated attached to bottoms of the two stand leg portions 44 and may include a rubberized pad connected to each of the bottoms.

A motor mount plate 78 is illustrated connected to the two load carrying members 30 and to the motor 70.

Figure 4:
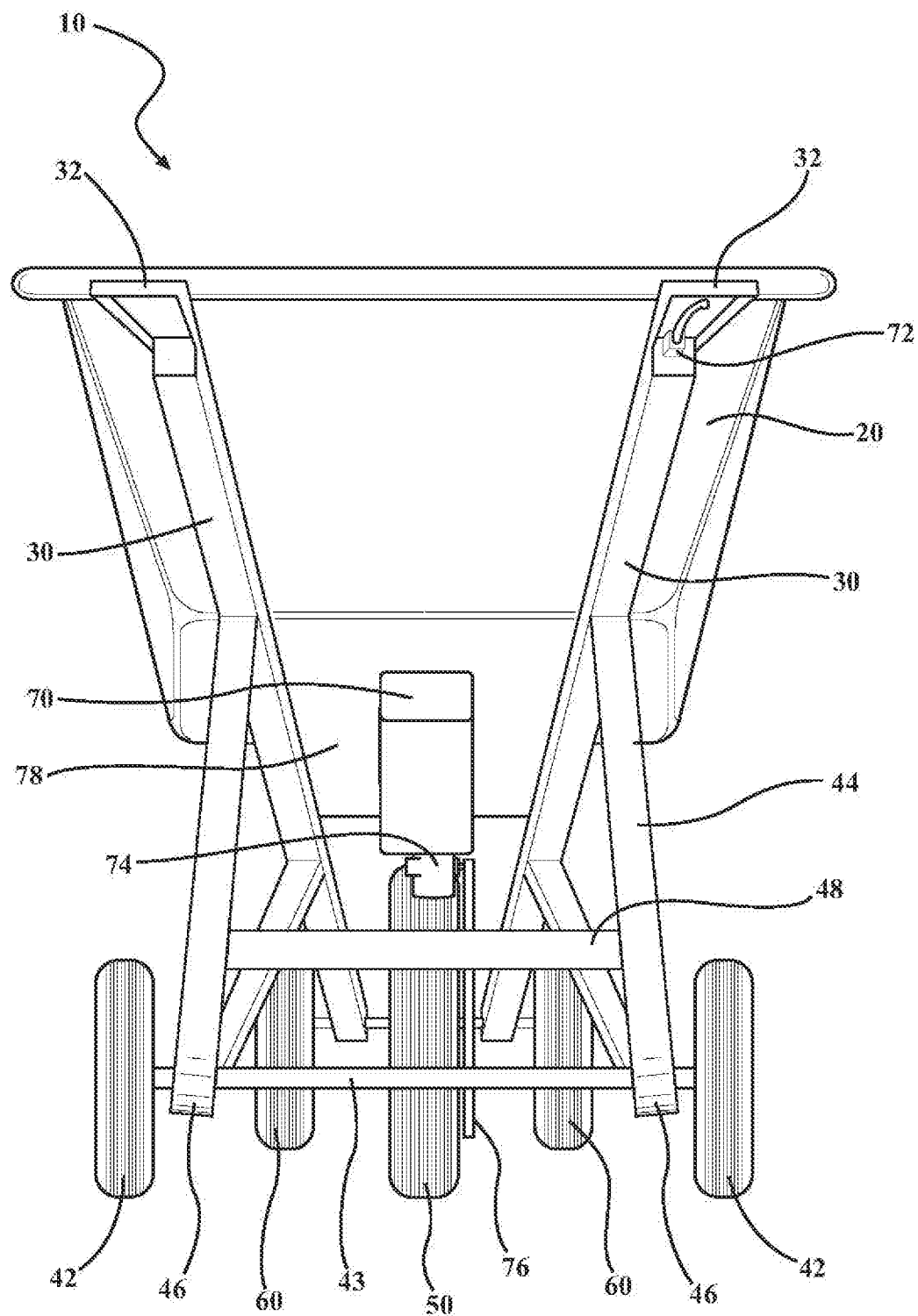
FIG. 4 schematically illustrates in rear view the wheelbarrow of FIG. 1, in accordance with the present disclosure.

FIG. 4 schematically illustrates in rear view the wheelbarrow of FIG. 1. The wheelbarrow 10 is illustrated including the cargo carrying portion 20, the two load carrying members 30, the two stand leg portions 44, the rear wheels 42, a rear wheel axle 43, the motor 70, the gearbox 74, the drive chain 76, the larger diameter middle wheel 50, and the smaller diameter side wheels 60. The two stand leg feet 46 are illustrated attached to the two stand leg portions 44. The leg stabilizing bracket 48 is illustrated connected to each of the two stand leg portions 44. Throttle control 72 is illustrated configured to control activation and/or torque output of motor 70. The two handle portions 32 are illustrated attached to the two load carrying members 30. The motor mount plate 78 is additionally illustrated.

Figure 5:
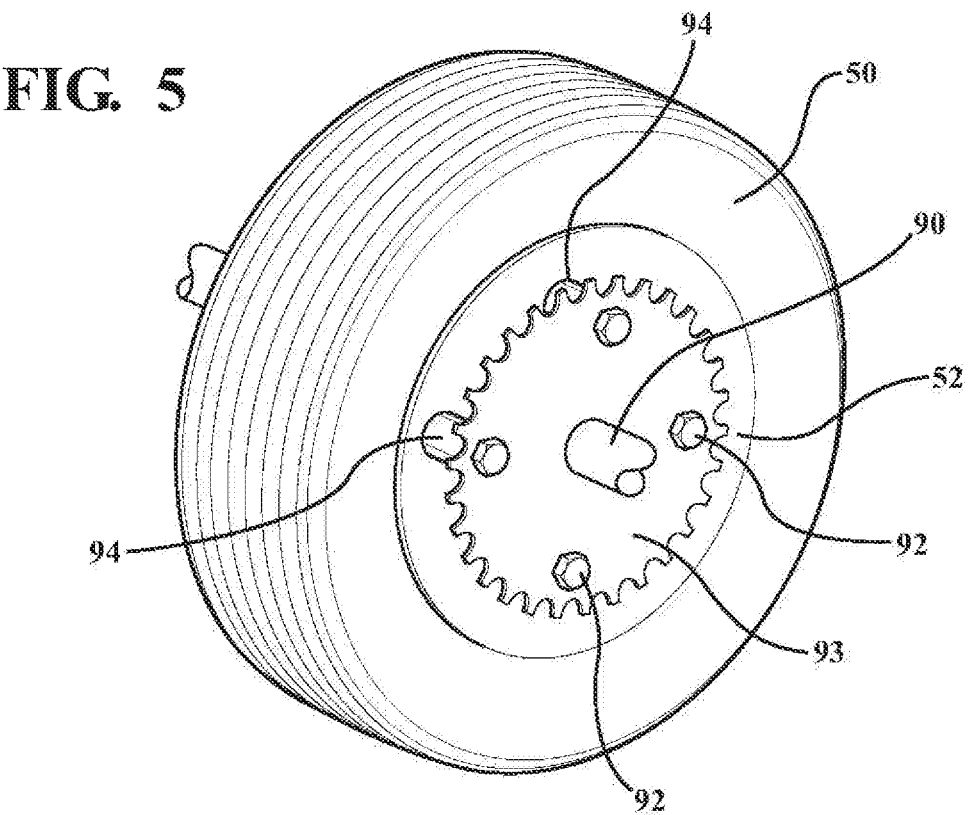
FIG. 5 schematically illustrates in a perspective side view the larger diameter middle wheel of the wheelbarrow of FIG. 1, including a chain drive sprocket attached to the larger diameter middle wheel, in accordance with the present disclosure.

FIG. 5 schematically illustrates in a perspective side view the larger diameter middle wheel 50 of the wheelbarrow 10 of FIG. 1, including a chain drive sprocket 93 attached to the larger diameter middle wheel 50. Four exemplary bolts 92 are illustrated connecting the chain drive sprocket 93 to the larger diameter middle wheel 50, including bolt shaft spacers 94 keeping the chain drive sprocket 93 at a designed distance from a wheel hub 52 of the larger diameter middle wheel 50, such that the drive chain 76 of FIG. 1 can provide force to the chain drive sprocket 93 without the drive chain 76 contacting the larger diameter middle wheel 50. Both the chain drive sprocket 93 and the larger diameter middle wheel 50 may be attached to the axle 90. In one embodiment, the chain drive sprocket 93 is welded to the axle 90. In one alternative embodiment, the chain drive sprocket 93 could be donut shaped and could connect only with the larger diameter middle wheel without connecting to the axle 90. In another alternative embodiment, the chain drive sprocket could additionally or alternatively be connected to one of the smaller diameter side wheels 60 of FIG. 1.

Figure 6:
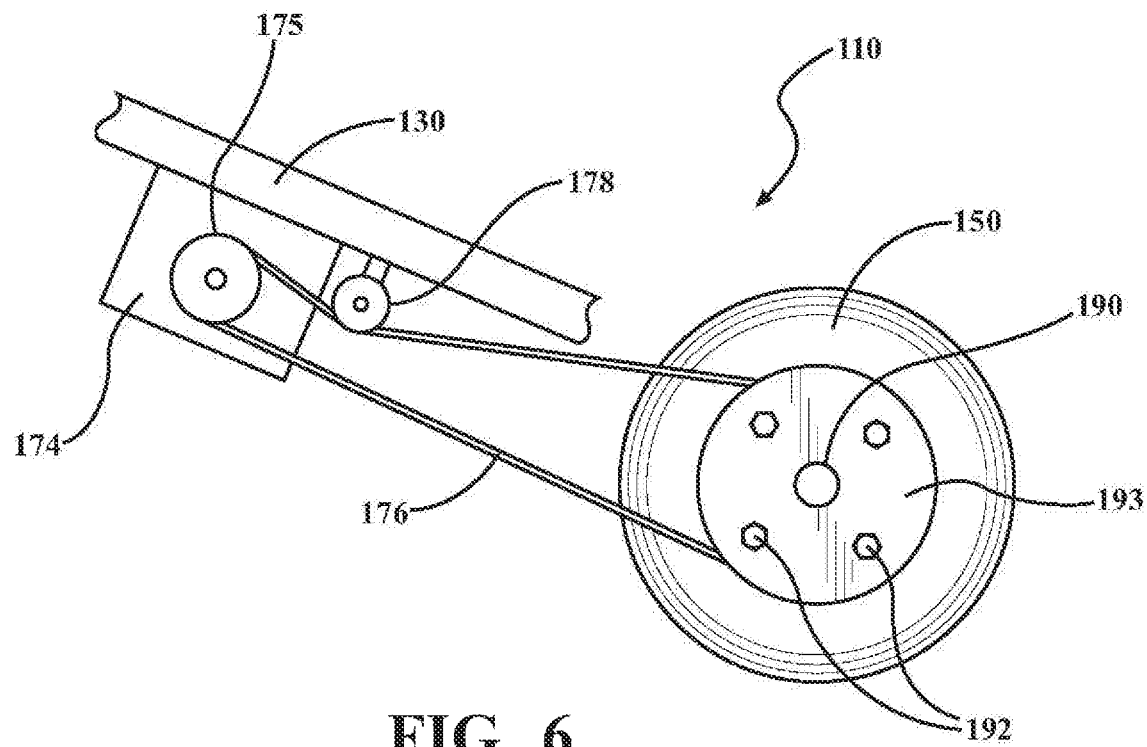
FIG. 6 schematically illustrates an alternative exemplary wheelbarrow including a multi-wheeled powered axle and a drive belt, in accordance with the present disclosure.

FIG. 6 schematically illustrates an alternative exemplary wheelbarrow 110 including a multi-wheeled powered axle and a drive belt 176. The wheelbarrow 110 may be similar to the wheelbarrow 10 of FIG. 1, except that the drive belt 176 may replace a drive chain. The drive belt 176 may be a rubberized belt similar to accessory drive belts used in automotive, marine, and other engines. A gearbox 174 is illustrated attached to a load carrying member 130 and including a drive pulley 175. A larger diameter middle wheel 150 is illustrated including a drive sprocket 193 attached to the larger diameter middle wheel 150 with four bolts 192. Drive sprocket 193 may be described as a drive pulley. Axle 190 is illustrated connected to both the larger diameter middle wheel 150 and the drive sprocket 193. An idler sprocket 178 is illustrated applying a force to the drive belt 176, bending the drive belt 176 and providing a designed amount of tension in the drive belt 176, such that the drive belt 176 may provide a desired amount of friction to each of the drive pulley 175 and the drive sprocket 193. The idler sprocket 178 may be spring loaded.

Figure 7:
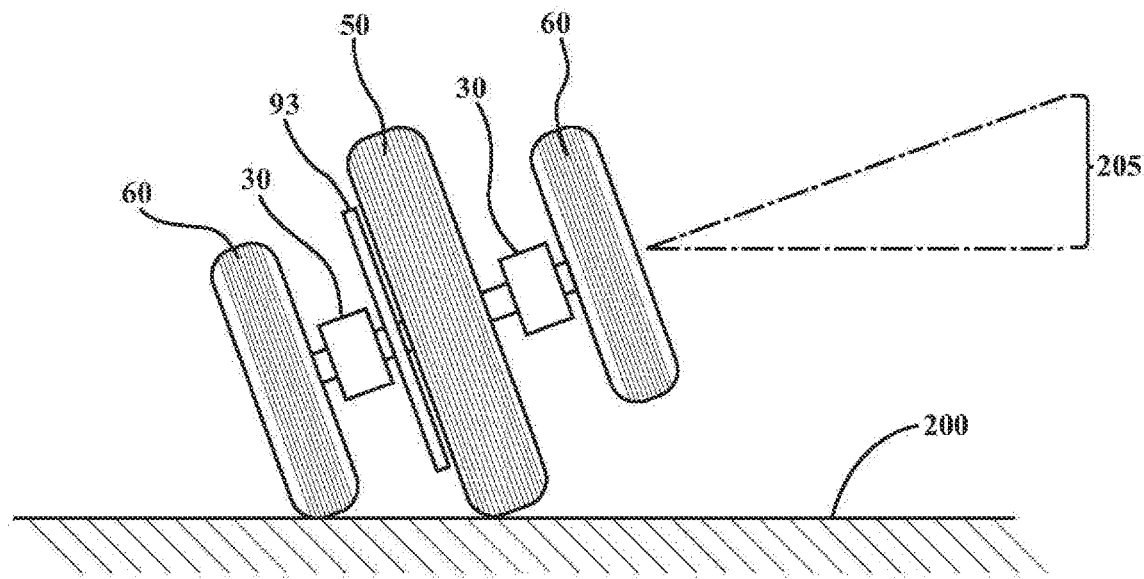
FIG. 7 schematically illustrates the front axle, the relatively larger diameter middle wheel, and the relatively smaller diameter side wheels of FIG. 1, wherein the axle is tilted in relation to a ground surface, in accordance with the present disclosure.

FIG. 7 schematically illustrates the front axle, the relatively larger diameter middle wheel 50, and the relatively smaller diameter side wheels 60 of FIG. 1, wherein the axle is tilted in relation to a ground surface 200. The front axle is tilted to an angle illustrated by dotted lines 205. The drive sprocket 93 and the relatively larger diameter middle wheel 50 are attached to axle between two attached load carrying members 30. The two relatively smaller diameter side wheels 60 are attached to the axle outside of the two load carrying members 30. The angle to which the front axle is tilted causes both the relatively larger diameter middle wheel 50 and the relatively smaller diameter side wheel 60 on a left side of the illustration to touch the ground surface 200. If the ground surface 200 is muddy or icy, the relatively larger diameter middle wheel 50 by itself may slip. The additional contact created by the relatively smaller diameter side wheel 60 touching the ground surface 200 increases traction for the wheelbarrow and may assist the wheelbarrow in moving forward. Additionally, tilting the wheelbarrow in this way may assist the wheelbarrow in turning.

Figure 8:
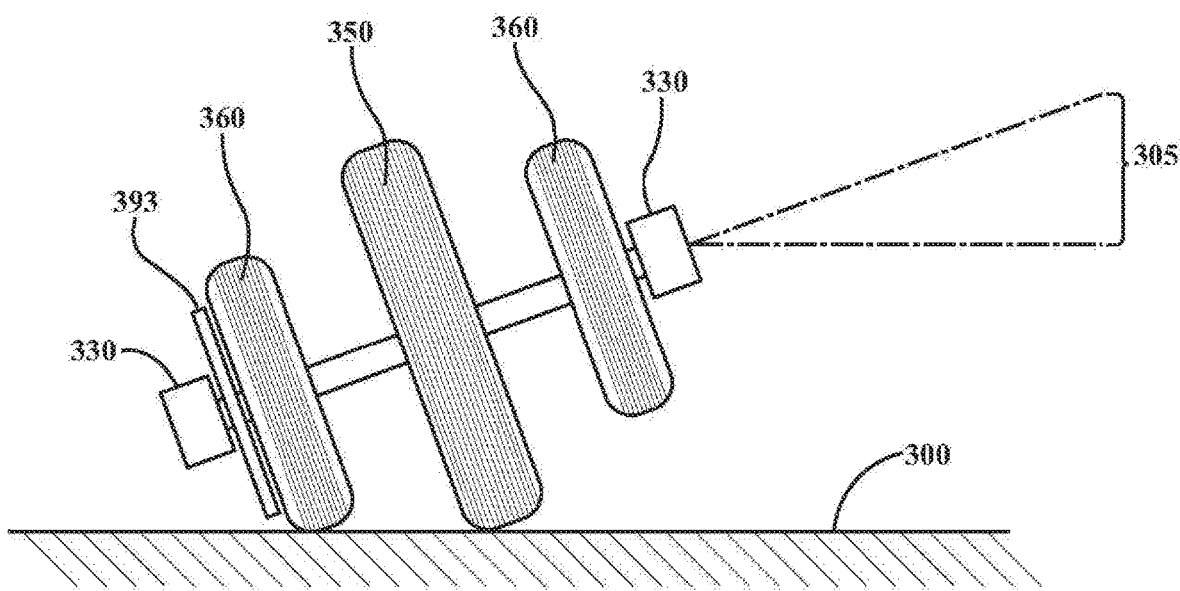
FIG. 8 schematically illustrates an alternative embodiment of a wheelbarrow including a front axle, wherein each of a relatively larger diameter middle wheel, and two relatively smaller diameter side wheels are mounted to the axle between two load carrying members of the wheelbarrow, wherein the axle is tilted in relation to a ground surface, in accordance with the present disclosure.

FIG. 8 schematically illustrates an alternative embodiment of a wheelbarrow including a front axle, wherein each of a relatively larger diameter middle wheel 350, and two relatively smaller diameter side wheels 360 are mounted to the axle between two load carrying members 330 of the wheelbarrow, wherein the axle is tilted in relation to a ground surface 300. The front axle is tilted to an angle illustrated by dotted lines 305. The drive sprocket 393 is illustrated next to one of the relatively smaller diameter side wheels 360 illustrated on a left side of the illustration. The drive sprocket 393 may be welded or otherwise attached to the axle, or the drive sprocket may be connected to the relatively smaller diameter side wheels 360 and the relatively larger diameter middle wheel 350 with features such as bolts extending through the components. The relatively larger diameter middle wheel 350, the relatively smaller diameter side wheels 360, and the drive sprocket 393 are attached to the axle between two attached load carrying members 330. The angle to which the front axle is tilted causes both the relatively larger diameter middle wheel 350 and the relatively smaller diameter side wheel 360 on a left side of the illustration to touch the ground surface 300.

Figure 9:
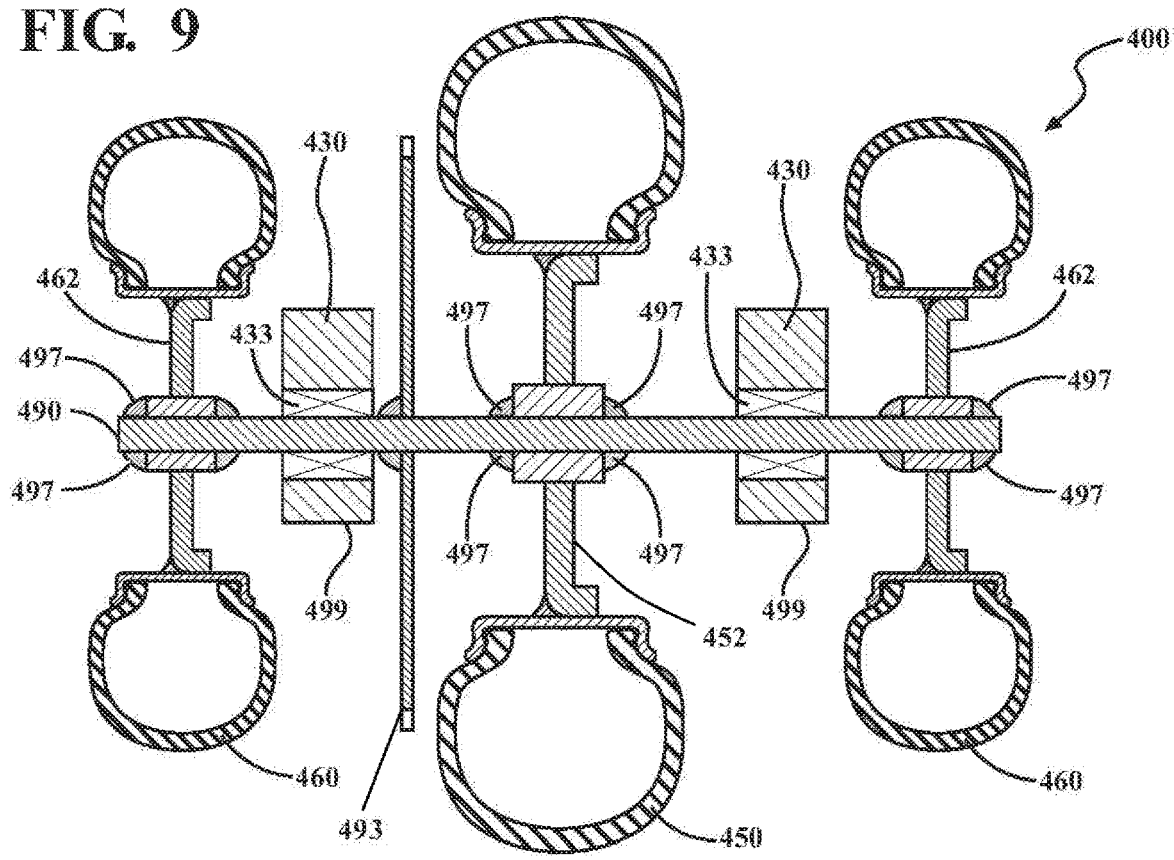
FIG. 9 schematically illustrates in cross-sectional view a front axle of a wheelbarrow, wherein each of a relatively larger diameter middle wheel, two relatively smaller diameter side wheels, and a drive sprocket are welded to the front axle, in accordance with the present disclosure.

FIG. 9 schematically illustrates in cross-sectional view a front axle 490 of a wheelbarrow 400, wherein each of a relatively larger diameter middle wheel 450, two relatively smaller diameter side wheels 460, and a drive sprocket 493 are welded to the front axle 490. The front axle 490 may be described as a live axle, with torque being transmitted through the axle as it spins with the attached components. Weld beads 497 are illustrated showing attachment of wheel hubs 462, a wheel hub 452, and the drive sprocket 493 to the front axle 490. Two load carrying members 430 are illustrated. Because the front axle 490 spins with the relatively larger diameter middle wheel 450, reducing friction between the front axle 490 and any attachment mechanism of the load carrying members 430 is advantageous. Roller bearings 433 may be used to attach the front axle 490 to the load carrying members 430. Brackets 499 are illustrated attaching the roller bearings 433 to the load carrying members 430.

Figure 10:
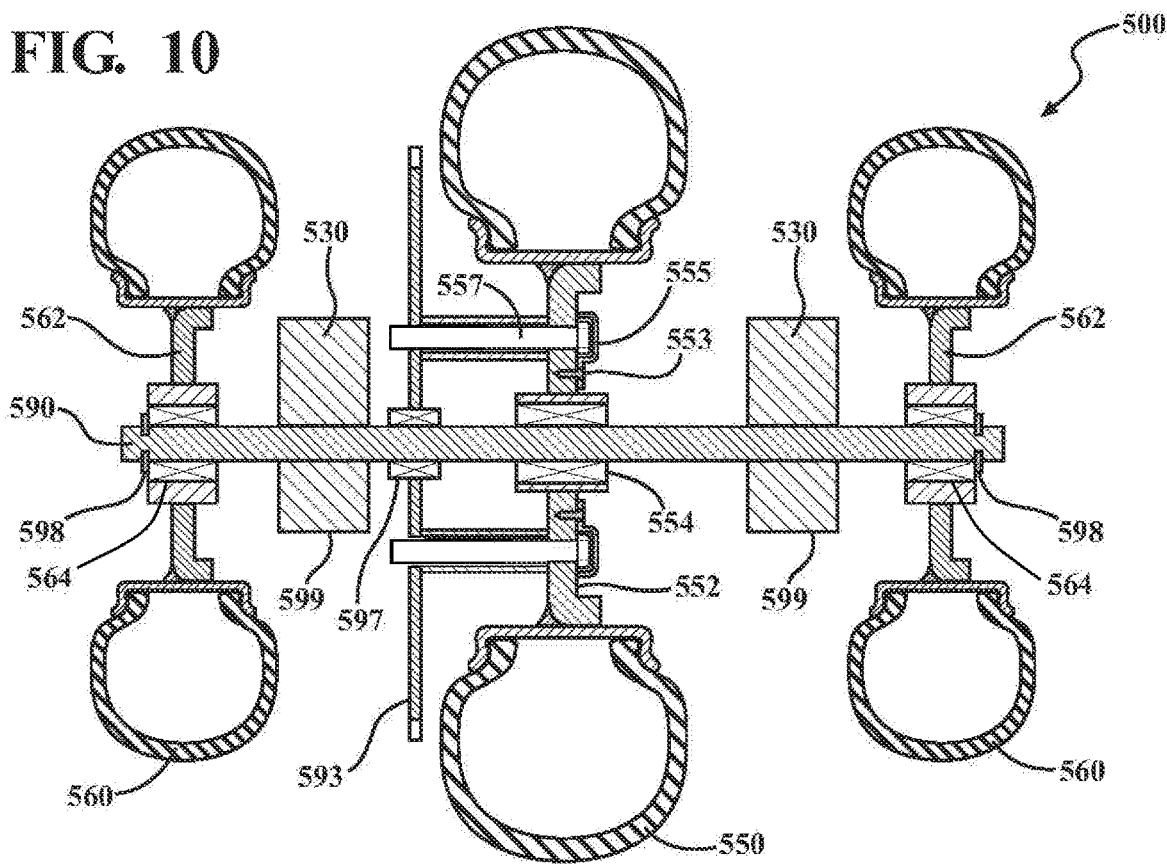
FIG. 10 schematically illustrates in cross-sectional view a front axle of an alternative wheelbarrow, wherein each of a relatively larger diameter middle wheel, two relatively smaller diameter side wheels, and a drive sprocket spin freely in relation to the front axle and wherein a removable pin is used to cause the relatively larger diameter middle wheel to spin with the drive sprocket, in accordance with the present disclosure.

FIG. 10 schematically illustrates in cross-sectional view a front axle 590 of an alternative wheelbarrow 500, wherein each of a relatively larger diameter middle wheel 550, two relatively smaller diameter side wheels 560, and a drive sprocket 593 spin freely in relation to the front axle 590 and wherein a removable pin 557 is used to cause the relatively larger diameter middle wheel 550 to spin with the drive sprocket 593. A wheel hub 552, two wheel hubs 562, and the drive sprocket 593 are illustrating including bearing 554, bearings 564, and bearing 597, respectively, configured to permit each of the components to spin freely in relation to the front axle 590. Retention washers 598 are illustrated attached to the distal ends of the front axle 590 to keep the relatively smaller diameter side wheels 560 from coming off the ends the front axle 590. The removable pin 557 is illustrated extending through both the wheel hub 552 and the drive sprocket 593. A pin cap 555 is held in place by a threaded fastener 553. The pin cap 555 holds the removable pin 557 in place. In the event that a user prefers that the relatively larger diameter middle wheel spin freely, the removable pin 557 may be removed. The wheelbarrow 500 is configured as a one-wheel drive wheelbarrow, wherein torque is not provided to the relatively smaller diameter side wheels 560. The front axle 590 is attached to the two load carrying members 530 with brackets 599.

Figure 11:
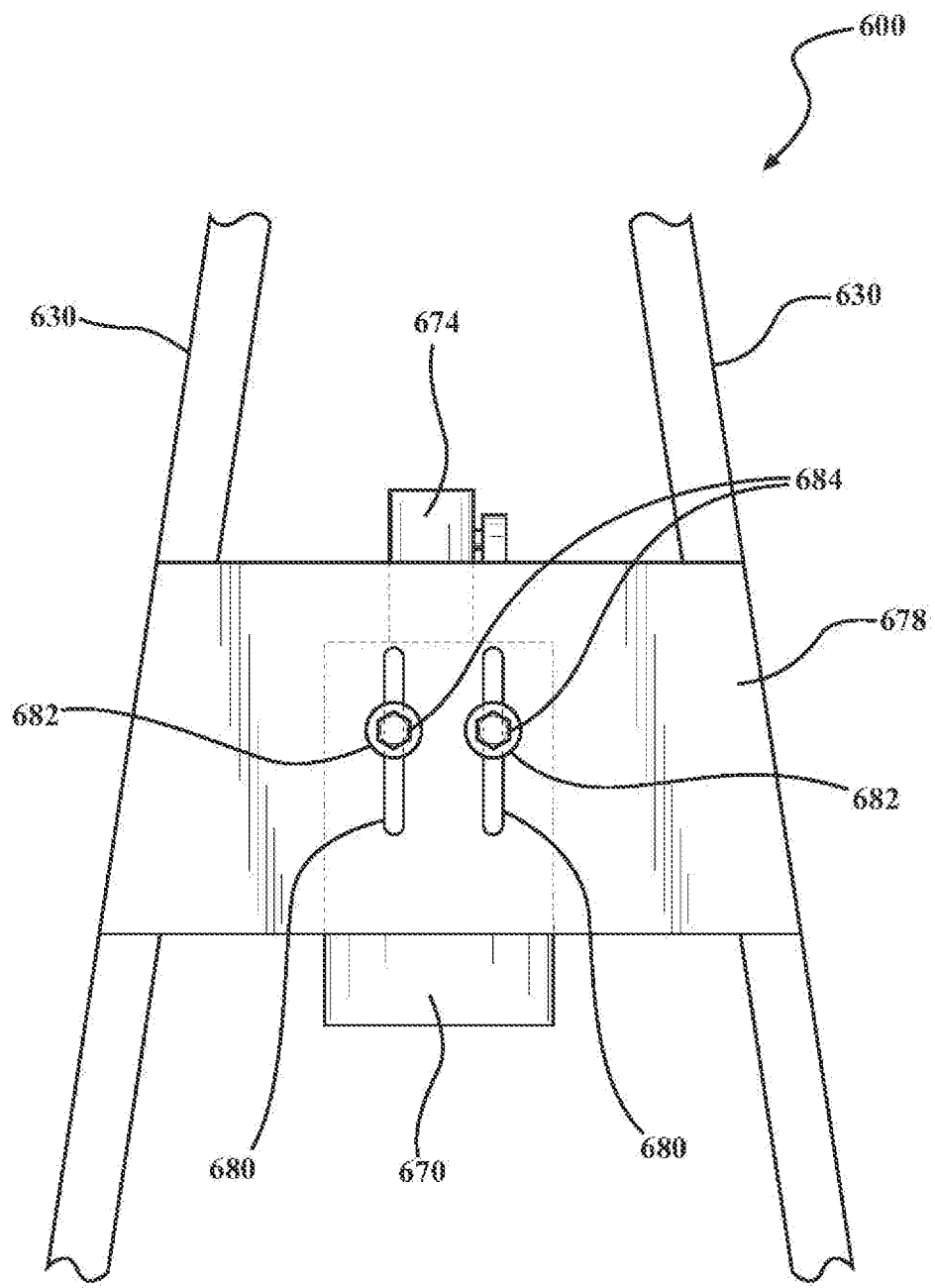
FIG. 11 schematically illustrates in top view a motor mount plate including a pair of slots operable to permit an adjustable distance between a drive sprocket of an attached gearbox and a front axle, in accordance with the present disclosure.

FIG. 11 schematically illustrates in top view a motor mount plate 678 including a pair of slots 680 operable to permit an adjustable distance between a drive sprocket of a motor 670 and an attached gearbox 674 and a front axle. A wheelbarrow 600 is illustrated. Washers 682 and bolts 684 are illustrated attaching the motor 670 to the motor mount plate 678. The motor mount plate 678 is illustrated attached to two load carrying members 630. This adjustable distance permits a user to adjust, for example, to drive chain stretch.

The gearbox attached to the motor may include a worm-drive gearbox. The gearbox and the motor may be operable to provide engine braking, for example, when the wheelbarrow is going down a steep hill. When the motor is off, the front wheels may be locked in place, which may make the wheelbarrow easier to tip/unload and may act as a parking brake.

While the best modes for carrying out the disclosure have been described in detail, those familiar with the art to which this disclosure relates will recognize various alternative designs and embodiments for practicing the disclosure within the scope of the appended claims.

What is claimed is:

1. A wheelbarrow with multiple wheels on a front axle, comprising:
    a cargo carrying portion;
    two load carrying members supporting the cargo carrying portion;
    a motor providing an output torque;
    the front axle attached to the two load carrying members;
    a middle wheel attached to the front axle and receiving the output torque from the motor;
    two side wheels attached to the front axle, one on either side of the middle wheel, wherein the two side wheels each have a smaller diameter than the middle wheel;
    a drive sprocket attached to the front axle and receiving the output torque; and
    a removable pin attaching the drive sprocket to the middle wheel and causing the middle wheel to spin with the drive sprocket; and
wherein, when the removable pin is removed, the middle wheel is free to spin relative to the drive sprocket.

2. The wheelbarrow of claim 1, further comprising:
    a gearbox attached to the motor; and
    a drive chain connected to the gearbox and connected to the drive sprocket.

3. The wheelbarrow of claim 2, further comprising a motor mount plate connecting the motor to the load carrying members; and
    wherein the motor mount plate enables mounting features of the motor to adjust a position of the motor relative to the front axle.

4. The wheelbarrow of claim 1, further comprising:
    a gearbox attached to the motor; and
    a drive belt connected to the gearbox and connected to the drive sprocket.

5. The wheelbarrow of claim 4, further comprising an idler sprocket adjusting tension in the drive belt.

6. The wheelbarrow of claim 1, further comprising two rear wheels.

7. The wheelbarrow of claim 1, further comprising a worm-drive gearbox attached to the motor.

8. The wheelbarrow of claim 1, wherein the middle wheel includes a ball bearing enabling the middle wheel to spin freely relative to the front axle.

9. The wheelbarrow of claim 1, wherein the side wheels each include a ball bearing enabling the side wheels to spin freely relative to the front axle.

10. A wheelbarrow with multiple wheels on a front axle, comprising:
   a cargo carrying portion;
   two load carrying members supporting the cargo carrying portion;
   a motor providing an output torque, the motor including a gearbox attached to the motor;
   the front axle attached to the two load carrying members;
   a drive sprocket attached to and operable to spin with the front axle;
   a drive chain attached to the gearbox and operable to transmit the output torque from the motor to the drive sprocket;
   a middle wheel attached to the front axle and receiving the output torque from the drive sprocket;
   a removable pin attaching the drive sprocket to the middle wheel and causing the middle wheel to spin with the drive sprocket; and
   two side wheels attached to the front axle, one on either side of the middle wheel, wherein the two side wheels each have a smaller diameter than the middle wheel; and
wherein, when the removable pin is removed, the middle wheel is free to spin relative to the drive sprocket.

11. The wheelbarrow of claim 10, wherein the two side wheels receive the output torque from the drive sprocket.

12. A wheelbarrow with multiple wheels on a front axle, comprising:
   a cargo carrying portion;
   two load carrying members supporting the cargo carrying portion;
   a motor providing an output torque, the motor including a gearbox attached to the motor;
   the front axle attached to the two load carrying members;
   a drive sprocket attached to and operable to spin with the front axle;
   a drive belt attached to the gearbox and operable to transmit the output torque from the motor to the drive sprocket;
   a middle wheel attached to the front axle and receiving the output torque from the drive sprocket;
   a removable pin attaching the drive sprocket to the middle wheel and causing the middle wheel to spin with the drive sprocket; and
   two side wheels attached to the front axle, one on either side of the middle wheel, wherein the two side wheels each have a smaller diameter than the middle wheel; and
wherein, when the removable pin is removed, the middle wheel is free to spin relative to the drive sprocket.

13. The wheelbarrow of claim 12, wherein the two side wheels receive the output torque from the drive sprocket.

\* \* \* \* \*